(12) United States Patent
Tzivanopoulos

(10) Patent No.: US 11,021,138 B2
(45) Date of Patent: Jun. 1, 2021

(54) PARKING ROBOT FOR A MOTOR VEHICLE AND A METHOD FOR OPERATING SUCH A PARKING ROBOT

(71) Applicant: Volkswagen Aktiengesellschaft, Wolfsburg (DE)

(72) Inventor: Theodoros Tzivanopoulos, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/692,765

(22) Filed: Nov. 22, 2019

(65) Prior Publication Data

US 2020/0180572 A1    Jun. 11, 2020

(30) Foreign Application Priority Data

Dec. 6, 2018    (DE) .......................... 102018221170.1

(51) Int. Cl.
| | | |
|---|---|---|
| *B60S 13/00* | (2006.01) | |
| *E04H 6/30* | (2006.01) | |
| *E04H 6/36* | (2006.01) | |
| *E04H 6/42* | (2006.01) | |

(52) U.S. Cl.
CPC .............. *B60S 13/00* (2013.01); *E04H 6/305* (2013.01); *E04H 6/36* (2013.01); *E04H 6/424* (2013.01)

(58) Field of Classification Search
CPC ....... B60S 13/00; B60B 29/002; B60B 30/02; B60B 2202/031; E04H 6/305; E04H 6/36; E04H 6/424
See application file for complete search history.

(56) References Cited

U.S. PATENT DOCUMENTS

| | | | | |
|---|---|---|---|---|
| 3,653,527 | A * | 4/1972 | Seymour ............... | B60B 29/002 414/427 |
| 4,401,405 | A * | 8/1983 | Ealet ......................... | B66F 9/18 414/428 |
| 4,460,306 | A * | 7/1984 | Hawkins ............... | B60B 29/002 280/43.2 |
| 4,687,070 | A * | 8/1987 | Ricciardi ................ | B60S 13/00 180/14.7 |
| 7,232,138 | B2 * | 6/2007 | Shubert ................... | B60P 3/125 280/47.34 |
| 7,845,286 | B2 * | 12/2010 | Hu ........................ | G01V 5/0008 104/162 |
| 8,851,210 | B2 * | 10/2014 | Pezzuti ................... | B66F 7/246 180/11 |

(Continued)

FOREIGN PATENT DOCUMENTS

| | | | | |
|---|---|---|---|---|
| CA | 2836301 | A1 * | 11/2012 | ............. B62B 3/104 |
| CN | 105041024 | A | 11/2015 | |

(Continued)

*Primary Examiner* — Kaitlin S Joerger
(74) *Attorney, Agent, or Firm* — Loza & Loza, LLP; Peter Zura

(57) ABSTRACT

Systems, apparatus and methods for a motor vehicle parking robot. The parking robot includes a pair of wheel support arms and a retracted wheel retention arm configured laterally from the outside of the parking robot and configured to lift a wheel of a vehicle by extending the pair of wheel support arms and affix the wheel in place on the parking robot by extending the wheel retention arms.

20 Claims, 2 Drawing Sheets

(56) References Cited

U.S. PATENT DOCUMENTS

| | | | |
|---|---|---|---|
| 8,870,197 B2* | 10/2014 | John | B60S 13/02 |
| | | | 280/79.4 |
| 9,389,614 B2* | 7/2016 | Shani | B65G 1/137 |
| 9,534,410 B2* | 1/2017 | Shani | E04H 6/24 |
| 10,035,688 B1* | 7/2018 | Robinson | B60B 30/04 |
| 10,590,669 B2* | 3/2020 | Boussard | E04H 6/305 |
| 2004/0146384 A1* | 7/2004 | Whelan | B60S 13/00 |
| | | | 414/426 |
| 2008/0181755 A1 | 7/2008 | Harris | |
| 2015/0290972 A1* | 10/2015 | Minor | B60B 29/002 |
| | | | 254/4 B |
| 2017/0320715 A9* | 11/2017 | Mathieson | B66F 5/025 |
| 2019/0322205 A1* | 10/2019 | Dombrowski | B62B 3/06 |
| 2020/0148512 A1* | 5/2020 | Herrera | B60S 13/00 |
| 2020/0180695 A1* | 6/2020 | Tzivanopoulos | B62D 15/0285 |
| 2020/0180712 A1* | 6/2020 | Ibenthal | E04H 6/36 |

FOREIGN PATENT DOCUMENTS

| | | | | |
|---|---|---|---|---|
| CN | 205400198 U | 7/2016 | | |
| CN | 106836916 A | 6/2017 | | |
| CN | 107859401 A | 3/2018 | | |
| CN | 207392849 U | 5/2018 | | |
| CN | 207761382 U | 8/2018 | | |
| DE | 3909702 A1 | 9/1990 | | |
| DE | 102015203506 A1 | 9/2016 | | |
| DE | 102016224098 A1 | 6/2018 | | |
| DE | 102017217827 A1 * | 4/2019 | | E04H 6/36 |
| WO | WO-2007110723 A3 * | 12/2007 | | E04H 6/245 |
| WO | 2010000018 A1 | 1/2010 | | |

\* cited by examiner

PARKING ROBOT FOR A MOTOR VEHICLE AND A METHOD FOR OPERATING SUCH A PARKING ROBOT

RELATED APPLICATIONS

The present application claims priority under 35 U.S.C. § 119 to German Pat. App. No. DE 10 2018 221 170.1, titled "A Parking Robot for a Motor Vehicle and a Method for Operating Such a Parking Robot," filed Dec. 6, 2018, the contents of which is incorporated by reference in its entirety herein.

TECHNICAL FIELD

The invention relates to a parking robot for a motor vehicle and a method for operating such a parking robot for a motor vehicle.

BACKGROUND

A parking robot is usually designed for transporting a motor vehicle inside a given infrastructural environment, for example, a parking garage, to a specified parking position. To this end, the parking robot extends, for example, a section thereof underneath the vehicle, lifts the vehicle and then travels with the lifted vehicle to the specified parking position, where it lowers the vehicle back to the ground. Using a parking robot, vehicles can therefore be moved completely autonomously within the infrastructural environment without any involvement of the driver of the vehicle and irrespective of whether or not the vehicle incorporates, for example, an advanced driver assistance system that is suited for at least partially autonomous parking.

DE 10 2016 224 098 A1 describes an omnidirectional mobile motor vehicle transportation platform that includes at least three Mecanum wheels. This mobile vehicle transportation platform can be inserted into the clearance between a vehicle floor and a roadway, and a lifting apparatus of the vehicle transportation platform then lifts the vehicle off the roadway. This causes the vehicle to be raised off the roadway, at least by its axles or entirely CN 207761382 U describes a transportation dolly for a motor vehicle that includes clamping parts on two opposing sides thereof and that is designed to be positioned underneath the motor vehicle and to lift a respective wheel of an axle of the vehicle by means of the respective clamping parts.

BRIEF SUMMARY

It is the object of the present disclosure to provide a solution that enables a parking robot transporting a motor vehicle to negotiate ramps and gradients with particular ease.

This object is achieved with the subject matter set forth in the independent claims. Advantageous embodiments with useful, non-trivial improvements of the invention are specified in the dependent claims, the following description and the figures.

BRIEF DESCRIPTION OF THE FIGURES

The present invention is illustrated by way of example and not limitation in the figures of the accompanying drawings, in which like references indicate similar elements and in which.

DETAILED DESCRIPTION

Figure 1:
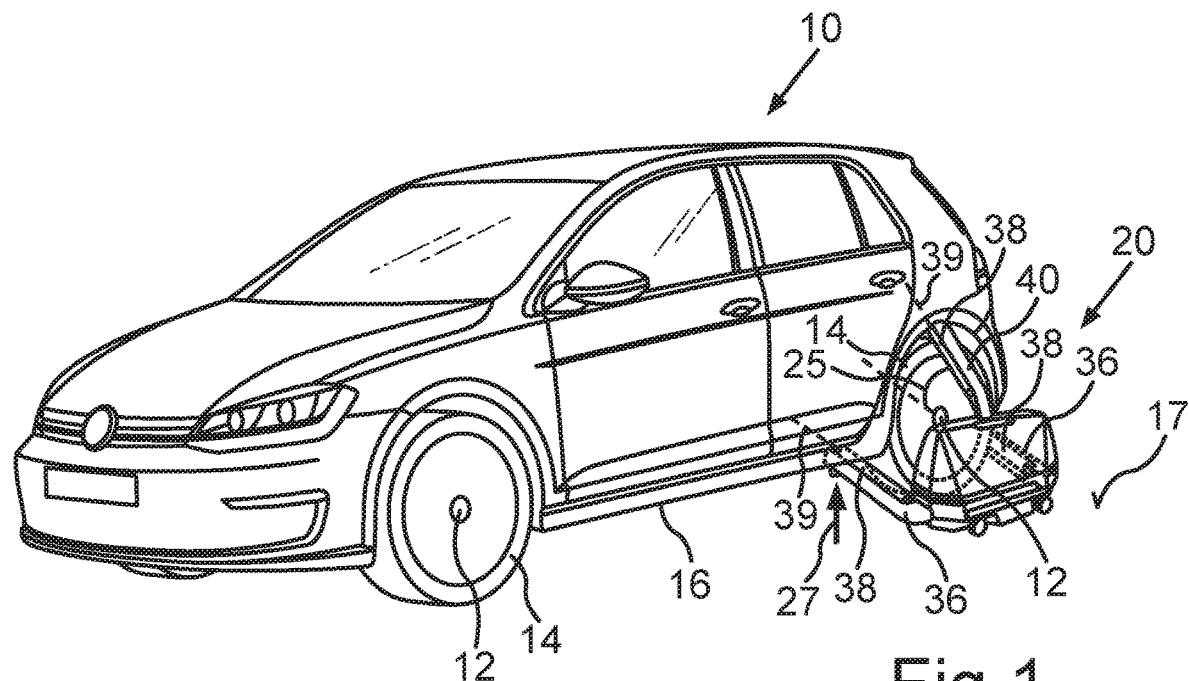
FIG. 1 a schematic depiction of a motor vehicle whose wheel is being lifted by a parking robot.

The embodiments that are explained below are preferred embodiments of the invention. The components of the embodiment that are described herein each represent individual features of the invention that must be seen independently of each other, which improve the invention also independently of each other, and which must therefore be viewed individually or in other combinations than the shown combination as a component of the invention. Moreover, the described embodiment can be supplemented with further features of the invention that have been described previously.

Elements in the figures that are functionally identical have been assigned identical reference signs.

The present disclosure is based on the finding that conventional one-part or multi-part parking robots, which each lift in the area of an axle of the vehicle or individual wheels of the vehicle, have been linked to the possibility that the vehicle may roll off the parking robot while being ferried over a ramp or a gradient. This is the case because the parking robot usually includes at least one pair of wheel support arms that hold and lift the wheel of the vehicle in the area of a bottom section of the wheel, respectively. However, as soon as the parking robot reaches, for example, a ramp with the lifted wheel and commences ascending the ramp, the point where the wheel rests on the parking robot shifts. Particularly for vehicles with large wheels, instead of ascending the ramp with the parking robot, it is now possible for the vehicle to roll over the rear of the parking robot, subsequently falling off the parking robot. A parking robot that is suitable for negotiating inclined planes should therefore include, for example, a holding mechanism that fixes the wheel particularly reliably in place on the parking robot.

The parking robot according to the present disclosure for a motor vehicle includes a pair of wheel support arms and a wheel retention arm. This means that the two wheel support arms are disposed, for example, on a bottom section of a base body of a parking robot and that the wheel retention arm is disposed, for example, on a top section thereof. The parking robot may be designed to autonomously approach a wheel of the vehicle, laterally from the outside, with the wheel support arms and the wheel retention arm in the retracted position. In some illustrative embodiments, the parking robot is designed to position itself at a specified receiving position laterally of one of the, for example, four wheels of the vehicle. When the wheel support arms and the wheel retention arm are in the retracted position, respectively, they are arranged in such a way that the wheel support arms are parallel relative to a longitudinal direction of the parking robot, and the wheel retention arm is parallel relative to a vertical direction of the parking robot. A depth of the parking robot, i.e., an extension of the parking robot perpendicular to the longitudinal direction of the parking robot, is, therefore, as small as possible, and only dependent on the depth of a base body of the a parking robot. In fact, when the parking robot is viewed laterally, i.e., in the longitudinal direction of the parking robot, neither the wheel support arms nor the wheel retention arm protrude in a transverse direction of the parking robot from the base body of the parking robot. The parking robot is moreover designed to independently approach one of the wheels of a vehicle. Accordingly, it is designed for autonomous travel.

The parking robot is furthermore designed to lift the wheel of the vehicle by extending the pair of wheel support arms. The parking robot is designed to move the wheel support arms from the retracted position thereof forward until they are therefore ultimately arranged in a perpendicular position relative to the longitudinal direction of the parking robot and the vertical direction of the parking robot. To this end, one of the wheel support arms is arranged in front of the wheel of the vehicle in a longitudinal direction of the vehicle and the other wheel support arm is arranged in the back of the wheel in the longitudinal direction of the vehicle. As soon as the two wheel support arms touch the sides of the wheel of the vehicle, respectively, they begin lifting the wheel off a roadway at the location where the vehicle is standing by means of further compressing action. Extending the pair of wheel support arms ultimately facilitates increasing the distance between the vehicle floor and the roadway, at least in the area of the lifted wheel.

Furthermore, the parking robot is designed such that by extending the wheel retention arm the wheel of the vehicle will be fixed in place on the parking robot. The wheel retention arm that moves, for example, from a top section of the parking robot toward the wheel is extended, for example, for as long as it takes until it touches the wheel of the vehicle and thereby contributes to securing the wheel against rolling off the wheel support arms, for example, while traveling over a ramp. Accordingly, the wheel retention arm is designed to retain the wheel on the parking robot. This is particularly useful for vehicles that have large wheels. In fact, a distance between the two wheel support arms and their height in relation to the roadway are strictly specified, thereby enabling the parking robot to lift and transport vehicles with small wheels and vehicles with large wheels. In the case of the mentioned larger wheels, for example, the parking robot reaches a static stability limit, at which point it is possible that the wheel, particularly while traveling over a ramp or a gradient, may roll over the wheel support arm that is arranged further below relative to the ramp. However, it is not only ramps and gradients where the wheel can roll off the parking robot; in fact, it is also possible for the wheel to, e.g., roll off while traveling over a bump or a pothole, at which point the vehicle rolls over the, seen in the direction of travel, front wheel support arm. Extending the wheel retention arm greatly reduces the likelihood that the wheel may roll off the parking robot because the wheel is now particularly reliably and solidly fixed in place on the parking robot. Accordingly, with the parking robot according to the invention, any travelling over ramps, gradients or uneven roadways can now be achieved particularly reliably.

One advantageous embodiment of the invention envisions arranging the wheel retention arm on a top section of the parking robot in a vertical direction of the parking robot and arranging the pair of wheel support arms on a bottom section of the parking robot in a vertical direction of the parking robot. Connecting lines of a center axis of a wheel support arm, respectively, and the wheel retention arm intersect in the respective extended positions at an angle of between 0 and 90 degrees. Due to these arrangements on the parking robot, for example, on a base body of the parking robot, it is possible to lift the wheel of the vehicle particularly advantageously in proximity of the roadway away from a roadway and, at the same time, reliably fix the same in place on the parking robot by means of the retention arm that is positioned on top. This arrangement of the wheel retention arm and the wheel support arms relative to the parking robot in a vertical direction of the parking robot is therefore advantageous for enabling a parking robot that is suitable for negotiating inclined planes, for traveling over ramps and gradients.

A further particularly advantageous embodiment provides that the wheel support arms include slip rolls, respectively. The slip roll may be a passive roll (degree of freedom f=1) that is rotatably supported about its own axis of rotation. This means that the respective slip roll is not fixedly disposed relative to the parking robot and the lifted wheel. In an extended position after lifting the wheel of the vehicle, the axis of rotation of the slip roll, respectively, is parallel relative to the axle the vehicle. After the parking robot, with retracted wheel support arms, automatically approached, laterally from the outside, the one of the wheels of the vehicle, any extending of the pair of the wheel support arms will cause the wheel to be lifted, wherein, when the wheel support arms are in their respective end positions, said wheel support arms are arranged parallel in relation to the axle of the vehicle in the area of the wheel. Correspondingly, when the wheel support arms are arranged in the extended position thereof in the longitudinal direction of the slip rolls, respectively, the slip rolls are arranged parallel relative to the axle of the vehicle, and therefore perpendicular relative to a circular wheel area of the wheel of the vehicle. By pressing the wheel support arms, while they are being extended, against the respective wheel of the vehicle, said wheel can slide off the slip roll, wherein the wheel is ultimately lifted from the vehicle floor, when the wheel support arms have reached their end positions where they are parallel in relation to the axles of the vehicle. The bilateral pressing action that is applied by the wheel support arms against the respective wheel achieves that the vehicle does not roll off while is it being lifted off and, if need be, lowered to the ground. Moreover, the lifting and lowering action is particularly efficient in terms of the required energy for lifting or lowering the vehicle, respectively.

A further embodiment of the present disclosure provides for the wheel retention arm to include a slip roll. Correspondingly, the wheel retention arm also includes a passive roller that is rotatably disposed about its own axis of rotation and therefore not statically fastened in a strictly specified position. In an extended position thereof, after the wheel of the vehicle has been lifted, the axis of rotation of the slip roll is at an angle of greater than 0 and smaller than 90 degrees relative to the axle of the vehicle. The wheel retention arm is furthermore designed to press with the slip roll against a top section of the wheel in a vertical direction of the vehicle against the wheel of the vehicle. Arranging the wheel retention arm on the top section of the parking robot in the vertical direction of the parking robot results in this position of the extended wheel retention arm, which means that it presses at the top section of the wheel against the wheel of the vehicle. However, the wheel retention arm does not press from the top against the wheel of the vehicle, which would be impossible, at any rate, due to the vehicle body; instead, it presses against the top margin of the tire jacket of the wheel. It is possible to envision herein that the wheel retention arm only touches the wheel of the vehicle, for example, exerting a small areal force, which is below a specified areal force limit, thereby exerting a correspondingly small amount of pressure on the wheel. However, the small amount of pressure on the wheel must be sufficient to reliably fix the wheel in place on the parking robot. Depending on the size of the wheel of the vehicle, the angle between the wheel retention arm and the axle of the vehicle increases.

Because the angle of the extended position of the wheel retention arm is variable and adjustable relative to the diameter of the wheel, the parking robot can be used for reliably transporting vehicles having wheels of different sizes, wherein the parking robot lifts exactly one wheel of the vehicle and fixes said wheel in place on the parking robot.

A further advantageous embodiment according to the present disclosure provides a sensor unit that is disposed on the section of the parking robot that has the wheel retention arm arranged thereon. This sensor unit can be, for example, a force measurement device, a contact sensor, which is positioned inside the wheel retention arm, or a camera. The parking robot is designed to control the extending action of the wheel retention arm by taking into account the sensor data from the sensor unit. Using, for example, a force measurement instrument as a sensor unit, it is possible to capture the level of force the wheel retention arm applies at a given time to the wheel of the vehicle. As soon as a specified force limit value has been reached, the extending action of the wheel retention arm can be stopped, and it is safe to assume that, in this position, the wheel retention arm is fixed in place on the parking robot with a sufficient amount of areal force, and therefore sufficient pressure, which is why the parking robot can negotiate steep ramps, for example, without the wheel of the vehicle rolling off. Alternatively, it is possible to provide only a contact sensor as a sensor unit whose sensor data, accordingly, provides information on the times when the wheel retention arm makes contact with the wheel of the vehicle by at least a section of the wheel retention arm.

It is therefore also possible to determine, as a function of the data provided by this contact sensor, when the extending action of the wheel retention arm is complete, because the wheel retention arm is sufficiently extended to fix the wheel in place on the parking robot. Alternatively, the extending action of the parking robot can be supported by a camera whose camera data contain information on when the wheel retention arm has reached the wheel of the vehicle and presses against the same. With the aid of the sensor unit, which is preferably disposed in the area of the wheel retention arm and therefore in the top section of the parking robot, it is therefore possible to devise the extending action of the wheel retention arm particularly reliable; this way, and independently of any determination of a wheel diameter, the extended position of the wheel retention arm by which the wheel can be optimally fixed in place on the parking robot can always be selected and found. To this end, trigger commands relating to the wheel retention arm and an analysis of the sensor data of the sensor unit can be determined and/or given by a sensor unit of the parking robot that is intended for said purpose.

According to other illustrative embodiments, the parking robot comprises an electric drive machine, a battery for supplying the electric drive machine with electric power, as well as at least one drive wheel for moving the parking robot. The parking robot is thus designed to trigger the wheel support arms and the wheel retention arm thereof independently of the motor vehicle or other parking robots, as well as traveling on the roadway, for example, within an infrastructural environment, such as a parking garage. Using the electric drive machine, the battery and the at least one drive wheel, the parking robot is also designed to negotiate ramps and other gradients, for example, inside this infrastructural environment. The parking robot can, moreover, comprise a control means that is designed to trigger the electric drive machine in such a manner that the parking robot travels autonomously, for example, along a specified trajectory of travel, from a starting position to a target position such as, for example, a specified parking space inside the parking garage. The parking robot is, furthermore, designed to support at least a partial mass of the vehicle in addition to the curb mass of the parking robot so that, for example, a vehicle having four wheels can be transported by a total of four parking robots, each having an electric drive machine, a battery for supplying the electric drive machine with electric power as well as at least one drive wheel for moving the respective parking robot from the starting position to the target position, possibly ferrying the same over a plurality of levels of a parking garage. Correspondingly, the parking robot has the necessary components at its disposal to facilitate an autonomous transportation of at least a partial mass of the vehicle.

According to a further advantageous embodiments, the parking robot comprises a sensor means that is designed for capturing the surroundings of the parking robot, as well as localizing obstacles that are in the way of the parking robot in the captured surrounding area. The sensor means of the parking robot can be, for example, a camera, a radar device, a laser scanner, an ultrasound device or a lidar device. This sensor means is also preferably disposed on the top section of the parking robot, for example, in addition to the sensor unit, to support the extending action of the wheel retention arm. This sensor means is designed to observe and capture the surroundings of the parking robot to detect, for example, columns inside a parking garage, other vehicles inside the parking garage or persons moving inside the parking garage. Moreover, the sensor means is designed to determine whether the captured object in the surroundings of the parking robot constitutes an obstacle that is in the path of the parking robot and to localize the same in the surroundings of the parking robot. For example, columns inside the parking garage or other vehicles that move inside the parking garage can be potential obstacles in the path of the parking robot and the vehicle that the parking robot has lifted, for example, if a trajectory of travel of the parking robot leads towards the corresponding obstacle.

Based on the data that have been captured and determined by the sensor means, a controlling means of the parking robot can, for example, establish a trajectory of travel for the parking robot from the starting position to the target position inside the parking garage by taking into account the captured surroundings and the obstacles localized therein. However, this trajectory of travel is only suited for travel at relatively low speeds; typically, maximally five to six kilometers per hour. If the parking robot or a plurality of parking robots, each having lifted wheels of the motor vehicle, are to be able to travel faster, for example, through the parking garage, a guide robot, for example, can provide the respective trajectories of travel or other trigger signals for the parking robots, thereby allowing for travel at higher speeds to the target position inside the parking garage. When determining the respective trajectories of travel of the respective parking robots, it is possible to also incorporate map data of the surroundings, for example, of the parking garage. Said data can be supplied, for example, by the server of the parking garage administrator, the guide robot and/or the respective parking robots. Still, due to the sensor means on the parking robot, the parking robot can always capture and localize any obstacles in its surroundings ahead of time such as, for example, a loose ball rolling towards it, and adjust the transmitted trajectory of travel accordingly, as needed, and/or initiate an emergency stop. Using the parking robot, it is therefore possible to move the vehicle inside the parking garage by triggering the drive machine according to the trajectory of travel that has been adjusted, as needed, based on the sensor means, whereby autonomous travel of the parking robot with the lifted wheel of the vehicle to the target position inside the parking garage is possible with particular reliability.

According to a further advantageous embodiment, the parking robot comprises a communications interface for a communications link with at least one further parking robot. Using this communications link, which is implemented, for example, as a wireless connection such as, for example, a WIFI connection, the parking robot can receive, for example, a trajectory of travel from the server of the parking garage administrator or from a guide robot; but it can also send data and signals, respectively, for example, information concerning a ball that is rolling toward the parking robot, to other parking robots, the guide robot or the server of the parking garage administrator. This results, for example, in the particularly advantageous possibility of interactions among a plurality of parking robots, interactions with a guide robot in the context of the robotic parking system and/or data exchanges with a server of the infrastructure administrator.

Moreover, the further illustrative embodiments disclose technologies and techniques for operating a parking robot, as specified above. The preferred embodiments and the advantages thereof that have been introduced in connection with the parking robot according to the present disclosure apply mutatis mutandis, insofar as applicable, also relative to the method according to the invention for operating such a parking robot. The method for operating the parking robot comprises the following steps: Autonomous approaching by the parking robot, with retracted wheel support arms and a retracted wheel retention arm, laterally from the outside, of one wheel of the vehicle, lifting the wheel by extending the pair of wheel support arms and fixing the wheel in place on the parking robot by extending the wheel retention arm. Particularly the last two steps are preferably performed consecutively, which means that the wheel of the vehicle is lifted first and only then the previously lifted wheel is fastened on the parking robot by extending the wheel retention arm, i.e., it is fixed in place thereon.

Still further illustrative embodiments provide that three further parking robots, each operating according to the method as described above, have lifted a further wheel for the total of four wheels of the vehicle and fixed them in place on the respective parking robots. After that, it is envisioned that the plurality of parking robots, which means the total of four robots, travel to the specified target position, each robot following the respectively provided trajectories of travel to the target position, and lowering the vehicle to the ground at that location by retracting the retention arm and the pair of wheel support arms, respectively. This means that, for example, a robotic parking system that comprises four parking robots can ferry a motor vehicle that has four wheels from, for example, a drop-off position in a receiving area of a parking garage to a parking space, for example, on an upper level of the parking garage, by means of the captioned method, and lower the vehicle to the ground at the location of the desired parking space. Alternatively, it is always possible to provide as many parking robots for a vehicle as the vehicle has wheels on which it travels. The server of the parking garage administrator, i.e., the infrastructural administration server, can supply information concerning the route of travel and the desired target position. Alternatively or additionally, while they transport the vehicle through the parking garage, the four parking robots can be accompanied by a guide robot that travels autonomously ahead of the vehicle, which is being supported by the four parking robots, and provides, while moving, the respective control signals such as, for example, the trajectories of travel, respectively, to the parking robots of the robotic parking system, whereby the parking robots facilitate particularly fast travel that is suitable for negotiating inclined planes throughout the parking garage by means of a plurality of parking robots.

Still further illustrative embodiments include the control means for the parking robot, as well as the control unit for triggering the extending action of the wheel retention arm of the parking robot. The control means and the control unit herein each include a processor means, set up for performing embodiments of the method according to the invention, respectively. To this end, the processor means can include at least one microprocessor and/or at least one microcontroller, respectively. Moreover, the processor means can include a program code that is set up to implement, upon the code being executed, the respective embodiment of the method according to the invention. The respective program code can be stored in a data memory of the respective processor means. The control unit therein can be comprised as part of the control means of the parking robot, for example, or vice versa. However, the two control devices, i.e., the control means and the control unit, can also be envisioned as two separate control devices inside the parking robot.

FIG. 1 shows of a motor vehicle 10 having a plurality of wheels 14 that are disposed on a total of two axles 12 of the vehicle 10. At a front axle 12 of the vehicle 10, a parking robot 20 lifts one of the wheels 14 of the vehicle 10. The parking robot 20 includes a pair of wheel supporting arms 36 and a wheel retention arm 40, and it is movably supported by two drive wheels 44. The parking robot 20 facilitates lifting the vehicle floor 16 away from the roadway 17, upon which the vehicle 10 is standing. A direction 27 signifying this lifting action of the vehicle 10 in the area of the wheel 14 that is lifted by the parking robot 20 is indicated by an arrow in FIG. 1.

The parking robot 20 includes slip rolls 38 on the wheel support arms 36 and the wheel retention arm 40, respectively, that are rotatably supported about the axis of rotation 39.

Figure 2:
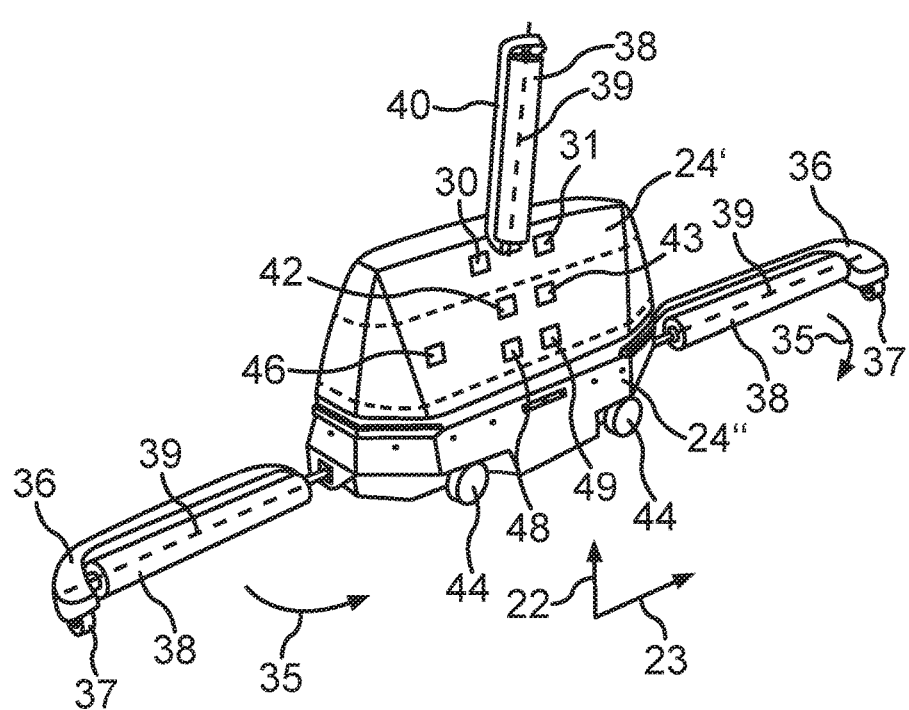
FIG. 2 a schematic depiction of a parking robot with retracted wheel support arms; and i FIG. 3 a schematic depiction of a parking robot ascending a ramp and lifting a wheel of a vehicle.

FIG. 2 is a detailed illustration of the parking robot 20, but seen here with retracted wheel support arms 36 and retracted wheel retention arm 40. With this arrangement of the wheel support arm 36 and the wheel retention arm 40, the parking robot 20 autonomously approaches the wheel 14, laterally from the outside, at the rear axle 12 of the vehicle 10 prior to lifting the wheel as shown in FIG. 1.

The illustration in FIG. 2 shows that a roller 37 is disposed at each end of each of the wheel support arms 36 in order to stabilize the parking robot 20. The wheel retention arm 40 is arranged on a top section 24' of the parking robot 20 in a vertical direction of the parking robot 22, and the two wheel support arms 36 are arranged on a bottom section 24" of the parking robot 20 in a vertical direction of the parking robot 22. The top section 24' of the parking robot 20 has furthermore disposed thereon a sensor unit 30, as well as a control unit 31.

In addition, the parking robot 20 comprises an electric drive machine 42, a battery 43 for supplying electric energy to the electric drive machine 42, the two drive wheels 44 for moving the parking robot 20, a communications interface 46, a sensor means 48 and a control means 49.

A longitudinal direction 23 of the parking robot has also been indicated in the sketch, and the wheel support arms 36 are arranged, respectively, parallel thereto when they are in the retracted position. Alternatively to the indicated parking robot 20, the wheel support arms 36 can be arranged in lateral recesses of the parking robot 20, respectively, when they are in the retracted position.

The parking robot 20 is designed to autonomously approach one of the wheels 14 of the vehicle 10, with retracted wheel support arms 36 and a retracted wheel retention arm 40, and subsequently, by extending the pair of wheel support arms 36, lift said tire 14 and, by extending the wheel retention arm 40, fixing the same in place on the parking robot 20. The swing direction 35 of each wheel support arm 36 has been indicated by respective arrows.

FIG. 1 shows an arrangement of this kind with extended wheel support arms 36 and an extended wheel retention arm 40 for the parking robot 20, wherein the parking robot 20 is depicted as arranged on the wheel 14 of the rear axle 12 of the vehicle 10. The wheel support arms 36 in FIG. 1 are arranged in such a way with the slip rolls 38 thereof that each axis of rotation 39 of the slip rolls 38 of each of the wheel support arms 36 is parallel relative to the axle 12 of the vehicle 10. When in the extended position thereof, the axis of rotation 39 of the slip roll 38 of the wheel retention arm 40 is arranged at an angle 25 that is between greater than 0 degrees and smaller than 90 degrees relative to the axle 12 of the vehicle 10 and presses in a vertical direction of the vehicle, which corresponds here to the vertical direction of the parking robot 22, against a top section of the wheel 14 of the vehicle 10.

The sensor unit 30 of the parking robot 20 that is depicted in FIG. 2 is configured, for example, as a force sensor, contact sensor or a camera and designed to monitor the extending action of the wheel retention arm 40. The wheel retention arm 40 is, in fact, only extended as far as the angle 25, which is specified by the control unit 31 and takes into account the sensor data of the sensor unit 30. A force limit value can be specified, for example. As soon as the wheel retention arm 40 presses against the wheel 14 of the vehicle 10 with a force that corresponds to the force limit value, the extending motion of the wheel retention arm 40 is terminated, and a specified position of the wheel retention arm 40 has been reached. The control unit 31 with access to the data of the sensor unit 30, for example, can provide the corresponding control commands to a travel motor of the wheel retention arm 40.

The sensor means 48 is designed to capture a surrounding area of the parking robot 20 such as, for example, columns inside a parking garage or a ball rolling towards the parking robot 20. The sensor means 48 is furthermore designed to localize obstacles in the path of the parking robot 20 inside the captured surroundings. In fact, columns inside the parking garage or even a ball rolling towards the parking robot 20 are possible obstacles that may interfere with the trajectory of travel of the parking robot 20 inside the parking garage. Based on the data of the sensor means 48, the control means 49 of the parking robot 20 can determine a trajectory of travel for the parking robot 20 that accounts for, for example, the captured ball that has been localized in the surrounding area as rolling toward the parking robot 20. Accordingly, the trajectory of travel can envision, for example, an emergency stop for the parking robot 20. The control means 49 is designed to implement the current trajectory of travel by means of triggering, correspondingly, the drive machine 42 and the drive wheel 44, i.e., triggering the parking robot 20 in accordance with the current trajectory of travel.

Via the communication interface 46, the parking robot 20 can establish a communications link with, for example, other parking robots 20 that are positioned, for example, at the other wheels 14 of the vehicle 10. This communications link can be embodied, for example, as a wireless connection, such as a WIFI connection. Alternatively or additionally to the communications links with the other parking robots 20, the parking robot 20 can also establish a communications link with the guide robot or the sever of the parking garage administrator, i.e., the infrastructural administration server, and maintain said link while operating the parking robot 20. This communications link can be used to provide the parking robot 20 with, for example, a trajectory of travel and/or trigger commands. It is possible, for example, to provide the parking robot 20 with the trigger command instructing it to approach the vehicle 10 via the communications link. The wheel 14 of the vehicle 10 that the robot is to approach can be specified herein. In addition, the parking robot 20 can receive the command instructing it to extend the wheel support arms 36 and, therefore, to lift the wheel 14 of the vehicle 10, a command that is subsequently executed, for example, by the control means 49. Corresponding control commands for the wheel retention arm 40 and the drive of the parking robot 20 can also be delivered via the communications link.

Figure 3:
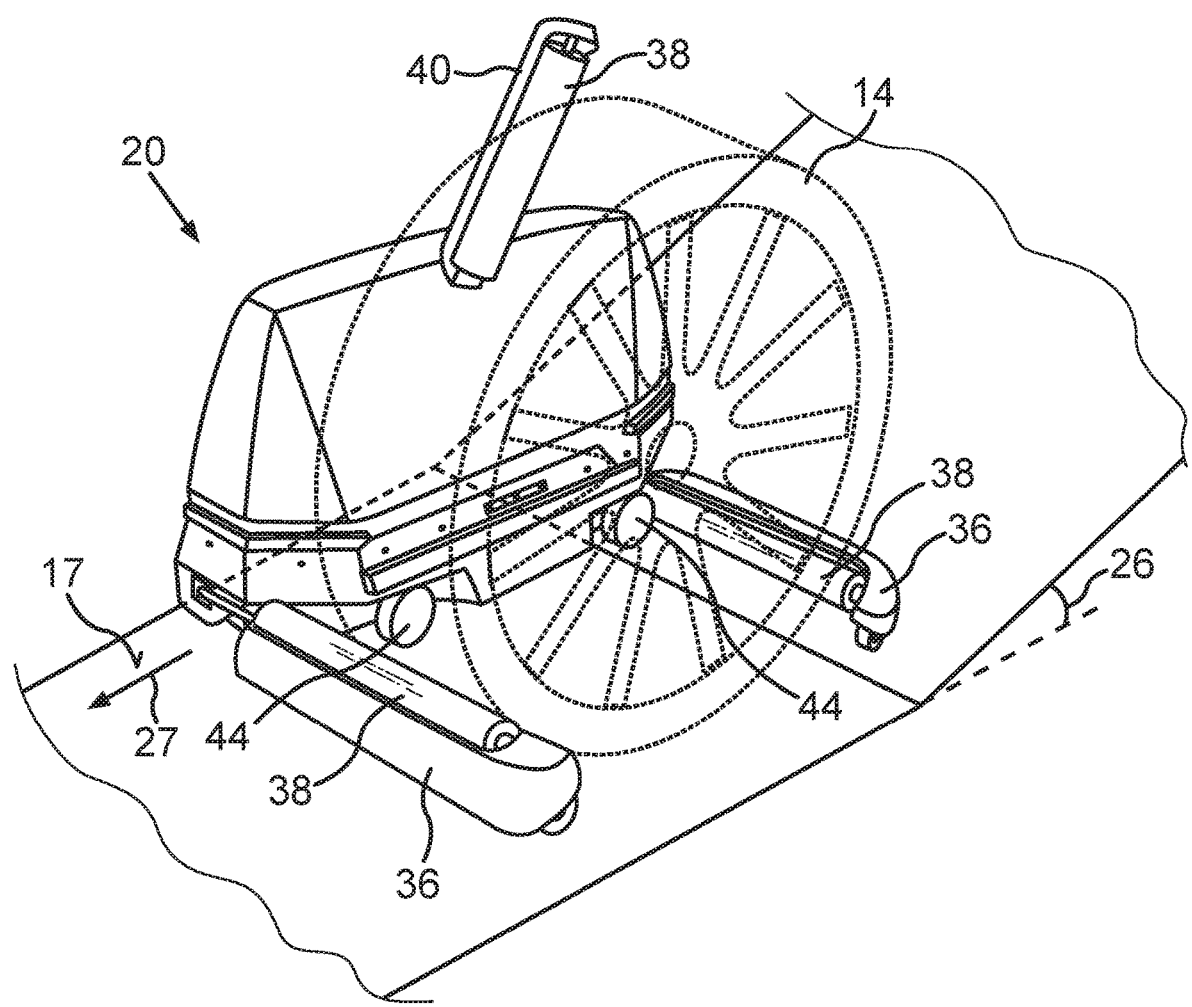

FIG. 3 shows an illustration of the parking robot 20 as it travels over a ramp. Said ramp has an angle of incline 26 that is greater than 0 degrees, which means the roadway 17 is uneven at the current location of the parking robot 20. The illustration shows that the wheel 14 of the vehicle 10, which is presently not shown, is fixed in place on the parking robot 20 by means of the wheel support arms 36 and the wheel retention arm 40, particularly in such a way that the vehicle cannot roll off the parking robot 20 in the marked direction 27, which is indicated by an arrow, but that the vehicle is instead sufficiently and reliably fixed in place on the parking robot 20.

A vehicle 10 can ultimately be ferried, for example, by four parking robots 20 that each have lifted one of the wheels 14 of the vehicle 10 and fixed the same in place on the respective parking robots 20, consistent with the respectively provided trajectories of travel for each parking robot 20, to a specified target position within, for example, a parking garage, having to negotiate, while underway to that location, ramps or other gradients, and again lowering the vehicle 10 to the ground at the target position by retracting the wheel retention arm 40 and the pair of wheel support arms 36, respectively. Afterwards the parking robots 20 can autonomously travel, with retracted wheel support arms 36 and retracted wheel retention arm 40, through the parking garage, for example, to another vehicle that awaits being parked.

The wheel retention arm 40 ultimately facilitates bracing the wheel 14 on the parking robot 20, which means a positive closure is achieved between the parking robot 20 and the wheel 14. The slip rolls 38 therein are supported as passive slip rolls 38 ensuring that the wheel 14 that is held in place, for example, by a locking brake is, nonetheless, movably supported on the parking robot 20 due to the rotation of the slip rolls 38 about their axis of rotation 39, respectively. The slip roll 38 of the wheel retention arm 40 presses the wheel 14 downward in the direction of the parking robot 20 by means of the bracing device, which is embodied by the wheel retention arm 40. The slip roll 38 of the wheel retention arm 40 is transversely disposed relative to the base body of the parking robot.

While travelling over the ramp, a contact point of the wheel 14 and the parking robot 20 may get caught on a slip roll 38 resulting in the risk that the vehicle 10 may topple off the parking robot 20 in the direction as indicated by arrow 27, i.e., the vehicle will roll off the parking robot. This risk is remedied, however, by providing the extended wheel retention arm 40 that fixes the wheel 14 in place on the parking robot 20. The parking robot 20 can rotate about the immobilized wheel 14 by means of the slip roll 38, particularly about an axis that is arranged along the axle 12 of the respective wheel 14. Accordingly, the parking robot 20 can easily ascend and descend a ramp without becoming wedged against the wheel 14.

Overall, the examples discussed above technologies and techniques for travelling over a ramp with a parking robot 20.

LIST OF REFERENCE SIGNS

10 Motor vehicle/vehicle
12 Axle
14 Wheel
16 Vehicle floor
17 Roadway
20 Parking robot
22 Vertical direction of the parking robot
23 Longitudinal direction of the parking robot
24', 24" Section
25 Angle
26 Gradient
27 Direction
30 Sensor unit
31 Control unit
35 Swing direction
36 Wheel support arm
37 Roller
38 Slip roll
39 Axis of rotation
40 Wheel retention arm
42 Drive machine
43 Battery
44 Drive wheel
46 Communications interface
48 Sensor means
49 Control means

The invention claimed is:

1. A parking robot for a motor vehicle, comprising:
a parking robot body comprising a processor device and a sensor unit communicatively coupled to the processing device to navigate the parking robot body autonomously to the motor vehicle;
a pair of wheel support arms, each positioned at different ends of a lower portion of the parking robot body, wherein the wheel support arms are configured to extend and retract laterally in a generally perpendicular direction from the parking robot body using data from the sensor unit;
a wheel retention arm, coupled to a top portion of the parking robot body, the wheel retention arm configured to extend and retract vertically in a perpendicular direction from the parking robot body using data from the sensor unit,
wherein the wheel support arms are configured to engage and lift a wheel of the motor vehicle by extending towards the wheel, and wherein the wheel retention arm is configured to engage and fix in place the wheel by extending towards the wheel.

2. The parking robot of claim 1, wherein the wheel support arms each include a slip roll.

3. The parking robot of claim 2, wherein each slip roll for each of the wheel support arms is configured to rotate parallel relative to an axle of the motor vehicle to engage and lift the wheel.

4. The parking robot of claim 1, wherein the wheel retention arm comprises a slip roll having an axis rotation having an angle greater than 0 degrees and smaller than 90 degrees relative to an axel of the motor vehicle when in an extended position while engaging the wheel, and wherein the wheel retention arm is configured to press against a top portion of the wheel in a vertical direction of the motor vehicle against the wheel.

5. The parking robot of claim 1, wherein the parking robot body comprises an electric drive machine, a battery for supplying electric energy to the electric drive machine, and at least one drive wheel for moving the parking robot.

6. The parking robot of claim 1, wherein the sensor unit is configured to capture a surrounding area of the parking robot body to detect obstacles in the way of the parking robot body inside the captured surroundings.

7. The parking robot of claim 1, wherein the parking robot body comprises a communications interface for communicating with at least one further parking robot.

8. A method of operating a parking robot for a motor vehicle, comprising:
navigating a parking robot body autonomously to the motor vehicle via a processor device and a sensor unit;
extending a pair of wheel support arms, each positioned at different ends of a lower portion of the parking robot body, laterally in a generally perpendicular direction relative to the parking robot body using data from the sensor unit;
extending a wheel retention arm, coupled to a top portion of the parking robot body, vertically in a perpendicular direction from the parking robot body using data from the sensor unit;
wherein extending the wheel support arms engage and lift a wheel of the motor vehicle by extending towards the wheel, and wherein the wheel retention arm engages and fixes in place the wheel by extending towards the wheel.

9. The method of claim 8, wherein extending the pair of wheel support arms comprises extending the wheel support arms, with each wheel support arm including a slip roll.

10. The method of claim 9, wherein extending the pair of wheel support arms comprises rotating each slip roll for each of the wheel support arms in a direction parallel, relative to an axle of the motor vehicle to engage and lift the wheel.

11. The method of claim 8, wherein the wheel retention arm comprises a slip roll having an axis rotation having an angle greater than 0 degrees and smaller than 90 degrees relative to an axel of the motor vehicle when in an extended position while engaging the wheel, and wherein the wheel retention arm is configured to press against a top portion of the wheel in a vertical direction of the motor vehicle against the wheel.

12. The method of claim 8, wherein navigating the parking robot body comprises navigating via an electric drive machine, a battery for supplying electric energy to the electric drive machine, and at least one drive wheel for moving the parking robot.

13. The method of claim 8, wherein navigating the parking robot body comprises capturing, via the sensor unit, a surrounding area of the parking robot body to detect obstacles in the way of the parking robot body inside the captured surroundings.

14. The method of claim 8, wherein the parking robot body comprises a communications interface for communicating with at least one further parking robot.

15. A parking robot for a motor vehicle, comprising:
a parking robot body comprising a processor device and a sensor unit communicatively coupled to the processing device to navigate the parking robot body autonomously to the motor vehicle;
a pair of wheel support arms, each positioned at different ends of a lower portion of the parking robot body, wherein the wheel support arms are configured to extend and retract laterally from a generally parallel to a generally perpendicular direction along a horizontal plane relative to parking robot body;
a wheel retention arm, coupled to a top portion of the parking robot body, the wheel retention arm configured to extend and retract vertically in a perpendicular direction from the parking robot body using data from the sensor unit,
wherein the wheel support arms are configured to engage and lift a wheel of the motor vehicle by extending towards the wheel, and wherein the wheel retention arm is configured to engage and fix in place the wheel by extending towards the wheel.

16. The parking robot of claim 15, wherein the parking robot body comprises a processor device and a sensor unit communicatively coupled to the processing device to navigate the parking robot body autonomously to the motor vehicle.

17. The parking robot of claim 15, wherein the wheel support arms each include a slip roll.

18. The parking robot of claim 17, wherein each slip roll for each of the wheel support arms is configured to rotate parallel relative to an axle of the motor vehicle to engage and lift the wheel.

19. The parking robot of claim 15, wherein the wheel retention arm comprises a slip roll having an axis rotation having an angle greater than 0 degrees and smaller than 90 degrees relative to an axel of the motor vehicle when in an extended position while engaging the wheel, and wherein the wheel retention arm is configured to press against a top portion of the wheel in a vertical direction of the motor vehicle against the wheel.

20. The parking robot of claim 15, wherein the parking robot body comprises an electric drive machine, a battery for supplying electric energy to the electric drive machine, and at least one drive wheel for moving the parking robot.

* * * * *